United States Patent
Toda et al.

(10) Patent No.: US 6,627,112 B2
(45) Date of Patent: Sep. 30, 2003

(54) PHOSPHOR FOR VACUUM ULTRAVIOLET EXCITED LIGHT EMITTING DEVICE

(75) Inventors: Kenji Toda, Niigata (JP); Keiji Ono, Tsukuba (JP); Susumu Miyazaki, Fujishiro-machi (JP)

(73) Assignee: Sumitomo Chemical Company, Limited, Osaka (JP)

( * ) Notice: Subject to any disclaimer, the term of this patent is extended or adjusted under 35 U.S.C. 154(b) by 246 days.

(21) Appl. No.: 09/730,581

(22) Filed: Dec. 7, 2000

(65) Prior Publication Data

US 2001/0017514 A1 Aug. 30, 2001

(30) Foreign Application Priority Data

Dec. 24, 1999 (JP) .......................... 11-366994
Dec. 24, 1999 (JP) .......................... 11-366995
Dec. 24, 1999 (JP) .......................... 11-366996
Dec. 24, 1999 (JP) .......................... 11-366997
Dec. 24, 1999 (JP) .......................... 11-366998

(51) Int. Cl.$^7$ .................. H01J 11/02; H01J 15/02; C09K 11/78; C09K 11/65; C09K 11/63
(52) U.S. Cl. ................. 252/301.4 R; 252/301.4 R; 313/486; 313/582; 313/584
(58) Field of Search ................. 313/486, 582, 313/584; 252/301.4 R, 301.4 F

(56) References Cited

U.S. PATENT DOCUMENTS 3,400,081 A * 9/1968 Brixner ............. 252/301.4 F
5,376,303 A * 12/1994 Royce et al. ......... 252/301.4 R

FOREIGN PATENT DOCUMENTS

EP 1 095 997 A2 5/2001

OTHER PUBLICATIONS

Blasse et al, "Structure and Eu3+–Fluorescence of Lithium and Sodium Lathanide Silicates and Germanates", J. Inorg. Nucl. Chem. 1967, vol. 29, pp. 2231–2241.*
G. Blasse and A. Bril, Structure and $Eu^{3+}$–Fluorescence of Lithium and Sodium Lanthanide Silicates and Germanates, J. Inorg. Nucl. Chem., 1967, vol. 29, 2231–41, Pergamon Press Ltd. (Northern Ireland).
European Search Report.
Database accession No. 133:244465 CA XP–002197251 (Kidorui (2000), 36, 240–241).
Database accession No. 115:81220 CA XP–002197252 (Yingyong Kexue Xuebao (1990), 8(4), 309–114).

* cited by examiner

Primary Examiner—C. Melissa Koslow
(74) Attorney, Agent, or Firm—Sughrue Mion, PLLC

(57) ABSTRACT

A phosphor for a vacuum ultraviolet excited light emitting device, obtained (1) by adding Eu or Tb as an activating agent to a substrate comprising a compound represented by the general formula $M^1M^2M^3O_4$, wherein $M^1$ represents at least one element selected from Na and Li, $M^2$ represents at least one element selected from Gd and Y, and $M^3$ at least one element selected from Ge and Si; (2) by adding Eu as an activating agent to a substrate comprising a compound containing SrO, $Al_2O_3$ and $B_2O_3$; or (3) by adding Eu or Tb as an activating agent to a substrate comprising a compound represented by the general formula $M_2O_2CN_2$, wherein M represents at least one element selected from La, Y and Gd.

19 Claims, No Drawings

PHOSPHOR FOR VACUUM ULTRAVIOLET EXCITED LIGHT EMITTING DEVICE

BACKGROUND OF THE INVENTION

1. Field of the Invention

The present invention relates to a phosphor suitable for vacuum ultraviolet excited light emitting devices such as a plasma display panel (hereinafter, referred to as "PDP"), a rare gas lamp and the like, and a vacuum ultraviolet device using said phosphor.

2. Description of the Related Art

Recently, there are frequent developments of a vacuum ultraviolet excited light emitting device having a mechanism for attaining light emission by exciting a phosphor with vacuum ultraviolet ray radiated by rare gas discharge. A typical example thereof is a development of PDP. PDP is noticed as a flat panel display which can replace for a cathode ray tube (CRT) since it enables a large scale and a thin display PDP is a display device constituted by placing a lot of fine discharge spaces (hereinafter, sometimes abbreviated as "display cell") in the form of a matrix, and a discharge electrode is provided in each display cell and on the inner wall of each display cell, a phosphor is applied. In a space in each display cell, a rare gas such as He—Xe, Ne—Xe, Ar and the like is sealed, and by applying voltage on the discharge electrode, discharging of the rare gas occurs in the display cell, and vacuum ultraviolet ray is radiated. A phosphor is excited by this vacuum ultraviolet ray, and visible lights are generated. An image is displayed by light emission of phosphors in display cells at given positions of a display device. As the phosphor used in each display cell, phosphors emitting blue color, green color and red color, respectively, are used, and by applying these phosphors in the form of a matrix, full color display can be effected.

Further, there is, recently, a tendency of reduction of harmful mercury from the standpoint of an environmental problem, and there is a notice on a rare gas lamp in which light is emitted by exciting a phosphor by emitting vacuum ultraviolet ray by discharge only of a rare gas using no mercury.

Recently, there are a lot of developments on a phosphor which gives light emission by being excited by vacuum ultraviolet ray and the like radiated by rare gas discharge. For example, regarding PDP, $BaMgAl_{10}O_{17}$:Eu, $Zn_2SiO_4$:Mn and (Y,Gd)$BO_3$:Eu are put into practical use as a blue phosphor, green phosphor and red phosphor, respectively. However, for improving properties of full color PDP, Improvements in brilliance, color purity, life and the like of a phosphor are desired.

SUMMARY OF THE INVENTION

An object of the present invention is to provide a phosphor for vacuum ultraviolet excited devices such as PDP and the like, having excellent light emitting efficiency, and a vacuum ultraviolet excited device using the same.

The present inventors have intensively studied for solving the above-mentioned problems, and resultantly, found that a phosphor in which Eu or Tb is added for activation in a mother crystal system of $M^1M^2M^3O_4$ (in the composition formula, $M^1$ represents at least one elements selected from Na and Li, $M^2$ represents at least one elements selected from Gd and Y, and $M^3$ represents at least one elements selected from Ge and Si.) is useful.

a phosphor in which an $Eu^{2+}$ ion is added for activation in a three-component mother crystal system of SrO—$Al_2O_3$—$B_2O_3$ is useful, and a phosphor in which Eu or Tb is added for activation in a mother crystal system of the general formula $M_2O_2CN_2$ (in the composition formula, M represents at least one elements selected from La, Y and Gd.) is useful, and have completed the present invention.

Namely, the present invention relates to the following (1) to (4).

(1) A phosphor for a vacuum ultraviolet excited light emitting device, obtained by adding Eu or Tb as an activating agent to a substrate comprising a compound represented by the general formula $M^1M^2M^3O_4$, wherein $M^1$ represents at least one elements selected from Na and Li, $M^2$ represents at least one elements selected from Gd and Y, and $M^3$ represents at least one elements selected from Ge and Si.

(2) A phosphor for a vacuum ultraviolet excited light emitting device, obtained by adding Eu as an activating agent to a substrate comprising a compound containing SrO, $Al_2O_3$ and $B_2O_3$.

(3) A phosphor for a vacuum ultraviolet excited light emitting device, obtained by adding Eu or Tb as an activating agent to a substrate comprising a compound represented by the general formula $M_2O_2CN_2$, wherein M represents at least one elements selected from La, Y and Gd.

(4) A vacuum ultraviolet excited light emitting device comprising a phosphor of any of the above-mentioned (1) to (3).

DETAILED DESCRIPTION OF THE PREFERRED EMBODIMENTS

The present invention will be illustrated in detail below.

First, a phosphor for a vacuum ultraviolet excited light emitting device, obtained by adding Eu or Tb as an activating agent to a substrate composed of a compound of the general formula $M^1M^2M^3O_4$ (in the composition formula, $M^1$ represents one or more elements selected from Na and Li, $M^2$ represents one or more elements selected from Gd and Y, and $M^3$ represents one or more elements selected from Ge and Si.) will be illustrated.

For example, when an Eu ion ($Eu^{3+}$) or a Tb ion ($Tb^{3+}$) is added as an activating agent to a substrate composed of a compound represented by $NaGdGeO_4$, a phosphor for a vacuum ultraviolet excited light emitting device, represented by the general formula $NaGd_{1-a}Eu_aGeO_4$ or $NaGd_{1-a}Tb_aGeO_4$ (wherein, $0.003 \leq a \leq 0.5$) is preferable. Further, when Gd of $NaGd_{1-a}Eu_aGO_4$ or $NaGd_{1-a}Tb_aGeO_4$ is substituted by Y, it is preferable that 0.5 to 100 mol % of Gd is substituted by Y.

Further, a phosphor for a vacuum ultraviolet excited light emitting device of the present invention can be applied to a phosphor excited with ultraviolet ray, X ray and electron beam out of the vacuum ultraviolet range, and to a device using the same.

A method for producing a phosphor according to the present invention is not particularly restricted, and for example, the phosphor is produced by compounding phosphor raw materials to provide a given component composition, as described below. As the raw material of sodium and lithium, carbonates, hydroxides, halides, nitrates and the like having high purity (99% or more) can be used, as the raw material of gadolinium and yttrium, oxides, carbonates, hydroxides, halides, nitrates and the like having high purity (99% or more) can be used, and as the raw material of germanium and silicon, oxides, carbonates and the like can be used, each being decomposed at higher temperature to give an oxide.

As the raw material of europium and terbium which can be an activating agent for causing light emission in the phosphor, there can be used oxides having high purity (99% or more), or hydroxides, carbonates, nitrates, halides, oxalates and the like having high purity (99% or more) which can be decomposed at higher temperature to give an oxide.

These raw materials are mixed by using a mortar, ball mill, V shape mixer, stirring apparatus or the like, then, the mixture is calcined at temperatures in the range from 900° C. to 1100° C. for several hours to decades hours, to obtain a phosphor. When hydroxides, carbonates, nitrates, halides, oxalates and the like which can be decomposed at higher temperature to give an oxide are used as a raw material, it is also possible to effect temporary calcination at temperatures in the range from 600° C. to 800° C. before main calcination.

As the calcination atmosphere in this procedure, air or oxygen atmosphere is preferable. Also, a flux in appropriate amount may be added for promoting calcination reaction.

Further, a product obtained by the above-mentioned method is fractured by using a ball mill, jet mill or the like before being washed, and if necessary, classified. For further enhancing crystallinity of the resulted phosphor, re-calcination is conducted, if necessary.

Next, a phosphor for a vacuum ultraviolet excited light emitting device, which is a blue light emitting phosphor in which Eu is added as an activating agent to a substrate composed of a compound of the formula $SrAl_2B_2O_7$ will be illustrated. When Eu ($Eu^{2+}$ ion) is added as an activating agent, the above-mentioned phosphor is preferably a phosphor for a vacuum ultraviolet excited light emitting device, of the general formula $Sr_{1-a}Eu_aAl_2B_2O_7$ (wherein, $0.003 \leq a \leq 0.5$).

Further, a phosphor for a vacuum ultraviolet excited light emitting device of the present invention can be applied to a phosphor excited with ultraviolet ray, X ray and electron beam out of the vacuum ultraviolet range, and to a device using the same.

A method for producing a phosphor according to the present invention is not particularly restricted, and for example, the phosphor is produced by compounding phosphor raw materials to provide a given component composition, as described below. As the aluminum raw material, α-alumina, Y-alumina having high purity (99.9% or more), or aluminum hydroxide, nitrates, halides and the like having high purity (99.9% or more) are used, and as the boron raw material, boron oxide, boric acid and the like having high purity are used. As the strontium raw material, oxides having high purity (99.9% or more), or hydroxides, carbonates, nitrates, halides, oxalates and the like having high purity (99.9% or more) which are decomposed at higher temperature to give an oxide can be used.

As the raw material of europium which can be an activating agent for causing light emission in the phosphor, there can be used the same compounds as described above.

These raw materials are mixed by using a ball mill, V shape mixer, stirring apparatus or the like, then, the mixture is calcined at temperatures in the range from 900° C. to 1100° C. for several hours to decades hours, to obtain a phosphor. When hydroxides, carbonates, nitrates, halides, oxalates and the like which can be decomposed at higher temperature to give an oxide are used as a raw material, it is also possible to effect temporary calcination at temperatures in the range from 600° C. to 800° C. before main calcination.

As the calcination atmosphere in this procedure, weak reductive atmosphere is preferable for producing divalent Eu stably. Also, a flux in appropriate amount may be added for promoting calcination reaction.

Further, a product obtained by the above-mentioned method is fractured by using a ball mill, jet mill or the like before being washed, and if necessary, classified. For further enhancing crystallinity of the resulted phosphor. re-calcination is conducted, if necessary.

Finally, a phosphor for a vacuum ultraviolet excited light emitting device, obtained by adding Eu or Tb as an activating agent to a substrate composed of a compound of the general formula $M_2O_2CN_2$ (in the composition formula, M represents one or more elements selected from La, Y and Gd.) will be illustrated.

$M_2O_2CN_2$ has a layered structure in which a $M_2O_2^{2-}$ layer and a $CN_2^{2-}$ layer are laminated alternately. When Eu or Tb is added as an activating agent to a substrate composed of a compound represented by $M_2O_2CN_2$ to obtain a phosphor, quenching due to energy transfer between activating agents can be suppressed, consequently, an activating agent can be added at higher concentration, and it has become possible to produce a phosphor having high brilliance by vacuum ultraviolet exciting.

Of phosphors for a vacuum ultraviolet excited light emitting device of the present invention, in the case, for example, of a phosphor obtained by adding Eu ($Eu^{3+}$ ion) or Tb ($Tb^{3+}$ ion) as an activating agent to a substrate composed of a compound of $La_2O_2CN_2$, preferable is a phosphor for a vacuum ultraviolet excited light emitting device, of the general formula $La_{2-a}Eu_aO_2CN_2$ or $La_{2-a}Tb_aO_2CN_2$ (wherein, $0.003 \leq a \leq 1$). It is preferable to substitute from 0.5 to 100% by mol of La by Y, and it is also preferable to substitute from 0.5 to 100% by mol of La by Gd.

Further, a phosphor for a vacuum ultraviolet excited light emitting device of the present invention can be applied to a phosphor excited with ultraviolet ray, X ray and electron beam out of the vacuum ultraviolet range, and to a device using the same.

A method for producing a phosphor according to the present invention is not particularly restricted, and for example, the phosphor is produced by compounding phosphor raw materials to provide a given component composition, as described below. As the raw materials of lanthanum, gadolinium and yttrium, oxides, carbonates, hydroxides, halides, nitrates and the like having high purity (99.9% or more) which can be decomposed at higher temperature to give an oxide can be used.

As the raw material of europium or terbium which can be an activating agent for causing light emission in the phosphor, there can be used the same compounds as described above.

These raw materials are mixed by using a mortar, ball mill, V shape mixer, stirring apparatus or the like, then, the mixture is calcined at temperatures in the range from 900° C. to 1100° C. for several hours to decades hours, to obtain a phosphor. When hydroxides, carbonates, nitrates, halides, oxalates and the like which can be decomposed at higher temperature to give an oxide are used as a raw material, it is also possible to effect temporary calcination at temperatures in the range from 600° C. to 800° C. before main calcination.

Further, it is preferable that a carbon source such as graphite and the like is charged simultaneously in calcination, and a gas containing a nitrogen source such as an ammonia gas and the like is used as a calcination atmosphere. Also, a flux in appropriate amount may be added for promoting calcination reaction.

Further, a product obtained by the above-mentioned method is fractured by using a ball mill, jet mill or the like before being washed, and if necessary, classified. For further enhancing crystallinity of the resulted phosphor, re-calcination is conducted, if necessary.

When a phosphor of the present invention is applied to a vacuum ultraviolet excited light emitting device such as PDP, rare gas lamp and the like, a preferable phosphor having high light emission strength is obtained, a vacuum ultraviolet excited light emitting device manifesting high brilliance can be realized, manifesting industrially extreme usefulness.

EXAMPLE

The following examples illustrate the present invention further in detail below, but do not limit the scope of the present invention.

Example 1

In producing $NaGd_{0.8}Eu_{0.2}GeO_4$, sodium carbonate $Na_2CO_3$ [manufactured by Kanto Kagaku K.K.], germanium oxide $GeO_2$ [manufactured by Kanto Kagaku K.K.], gadolinium oxide $Gd_2O_3$ [manufactured by Wako Pure Chemical Industries Ltd.], and europium oxide $Eu_2O_3$ [manufactured by Shin-Etsu Chemical Co., Ltd.] were used as starting raw materials. The raw materials used were all guaranteed reagents having purities of 99.5% or more. These raw materials were compounded so that molar ratio of $Na_2CO_3:Gd_2O_3:Eu_2O_3:GeO_2$ was 1.3:0.8:0.2:2, and wet-mixed sufficiently in acetone by a mortar, and dried. The reason for compounding of $Na_2CO_3$ in an amount 30% higher than stoichiometric ratio is that $Na_2CO_3$ itself acts also as a reaction accelerator in producing $NaGd_{0.8}Eu_{0.2}GeO_4$. The resulted mixed raw material was charged in a stainless mold, pressured under a pressure of 20 MPa to mold a circular pellet having a diameter of 15 mm and a thickness of 3 mm. The resulted pellet was placed in an alumina crucible, and calcined for 24 hours at 950° C. in an electric oven. The temperature raising speed was 10° C./min. The calcined sample was placed in a mortar and ground, then, washed with water to produce $NaGd_{0.8}Eu_{0.2}GeO_4$. Formation of a single phase of $NaGd_{0.8}Eu_{0.2}GeO_4$ was confirmed by using a powder X ray diffraction apparatus [manufactured by Rigaku Denki K.K., Geiger Flex, SG-7 type].

The resulted phosphor was irradiated with ultraviolet ray by using an excimer 146 nm lamp (manufactured by Ushio Denki K.K.) in a vacuum chamber of $5 \times 10^{-2}$ Torr or less, to cause strong emission of red light.

Example 2

In producing $NaY_{0.8}Eu_{0.2}GeO_4$, sodium carbonate $Na_2CO_3$ [manufactured by Kanto Kagaku K.K.], germanium oxide $GeO_2$ [manufactured by Kanto Kagaku K.K. yttrium oxide $Y_2O_3$ [manufactured by Wako Pure Chemical Industries Ltd.], and europium oxide $Eu_2O_3$ [manufactured by Shin-Etsu Chemical Co., Ltd.] were used as starting raw materials. The raw materials used were all guaranteed reagents having purities of 99.5% or more. These raw materials were compounded so that molar ratio of $Na_2CO_3:Y_2O_3:Eu_2O_3:GeO_2$ was 1.3:0.8:0.2:2, and wet-mixed sufficiently in acetone by a mortar, and dried. The reason for compounding of $Na_2CO_3$ in an amount 30% higher than stoichiometric ratio is that $Na_2CO_3$ itself acts also as a reaction accelerator in producing $NaY_{0.8}Eu_{0.2}GeO_4$. The resulted mixed raw material was charged in a stainless mold, pressured under a pressure of 20 MPa to mold a circular pellet having a diameter of 15 mm and a thickness of 3 mm. The resulted pellet was placed in an alumina crucible, and calcined for 24 hours at 950° C. in an electric oven. The temperature raising speed was 10° C./min. The calcined sample was placed in a mortar and ground, then, washed with water to produce $NaY_{0.8}Eu_{0.2}GeO_4$.

The resulted phosphor was irradiated with ultraviolet ray by using an excimer 146 nm lamp (manufactured by Ushio Denki K.K.) in a vacuum chamber of $5 \times 10^{-2}$ Torr or less, to cause strong emission of red light.

Example 3

In producing $NaGd_{0.8}Tb_{0.2}GeO_4$, sodium carbonate $Na_2CO_3$ [manufactured by Kanto Kagaku K.K.], germanium oxide $GeO_2$ [manufactured by Kanto Kagaku K.K.], gadolinium oxide $Gd_2O_3$ [manufactured by Wako Pure Chemical Industries Ltd.], and terbium oxide $Tb_2O_3$ manufactured by Wako Pure Chemical Industries Ltd.] were used as starting raw materials. The raw materials used were all guaranteed reagents having purities of 99.5% or more. These raw materials were compounded so that molar ratio of $Na_2CO_3:Gd_2O_3:Tb_2O_3:GeO_2$ was 1.3:0.8:0.2:2, and wet-mixed sufficiently in acetone by a mortar, and dried. The reason for compounding of $Na_2CO_3$ in an amount 30% higher than stoichiometric ratio is that $Na_2CO_3$ itself acts also as a reaction accelerator in producing $NaGd_{0.8}Tb_{0.2}GeO_4$. The resulted mixed raw material was charged in a stainless mold, pressured under a pressure of 20 MPa to mold a circular pellet having a diameter of 15 mm and a thickness of 3 mm. The resulted pellet was placed in an alumina crucible, and calcined for 24 hours at 950° C. in an electric oven. The temperature raising speed was 10° C./min. The calcined sample was placed in a mortar and ground, then, washed with water to produce $NaGd_{0.8}Tb_{0.2}GeO_4$. Formation of a single phase of $NaGd_{0.8}Tb_{0.2}GeO_4$ was confirmed by using a powder X ray diffraction apparatus [manufactured by Rigaku Denki K.K., Geiger Flex, SG-7 type].

The resulted phosphor was irradiated with ultraviolet ray by using an excimer 146 nm lamp (manufactured by Ushio Denki K.K.) in a vacuum chamber of $5 \times 10^{-2}$ Torr or less, to cause strong emission of green light.

Example 4

15.6 g of aluminum hydroxide $Al(OH)_3$ [manufactured by Koujundo Kagaku Kenkyusho, 99.9% or more], 14.0 g of strontium carbonate [manufactured by Wako Pure Chemical Industries Ltd., Guaranteed Reagent], 7.0 g of boron oxide $B_2O_3$ [manufactured by Wako Pure Chemical Industries Ltd.], and 8.8 g of europium oxide [manufactured by Wako Pure Chemical Industries Ltd., Guaranteed Reagent] were weighed, and the mixture was ground to mix for 1 hour in an agate mortar. The mixture was calcined at 900° C. for 12 hours on a platinum plate placed on an alumina boat in reducing atmosphere of a mixed gas of nitrogen and hydrogen [nitrogen (volume):hydrogen (volume)=9:1], then, cooled to room temperature. Formation of a single phase of $SrAl_2B_2O_7:Eu^{2+}$ (5 mol %) was confirmed by using a powder X ray diffraction apparatus.

The resulted phosphor was irradiated with ultraviolet ray by using an excimer 146 nm lamp (manufactured by Ushio Denki K.K.) in a vacuum chamber of $5 \times 10^{-2}$ Torr or less, to cause strong emission of bluish violet light.

Example 5

In producing $La_{1.4}Gd_{0.4}Eu_{0.2}O_2CN_2$ lanthanum oxide $La_2O_3$, gadolinium oxide $Gd_2O_3$, and europium oxide $Eu_2O_3$ were used as starting raw materials. These raw materials were compounded so that molar ratio of $La_2O_3:Gd_2O_3:Eu_2O_3$ was 1.4:0.4:0.2, and wet-mixed sufficiently in acetone by a mortar, and dried. The resulted mixed raw material and graphite were charged in a tubular furnace, and calcined at 970° C. for 30 hours under ammonia flow (50 ml/min.). Formation of a single phase of $La_{1.4}Gd_{0.4}Eu_{0.2}O_2CN_2$ was confirmed by using a powder X ray diffraction apparatus [manufactured by Rigaku Denki K.K., Geiger Flex, SG-7 type].

The resulted phosphor was irradiated with ultraviolet ray by using an excimer 146 nm lamp (manufactured by Ushio Denki K.K.) in a vacuum chamber of $5 \times 10^{-2}$ Torr or less, to cause strong emission of red light.

Example 6

In producing $La_{1.7}Tb_{0.3}O_2CN_2$, lanthanum oxide $La_2O_3$, and terbium oxide $Tb_2O_3$ were used as starting raw materials. These raw materials were compounded so that molar ratio of $La_2O_3:Tb_2O_3$ was 1.7:0.3, and wet-mixed sufficiently in acetone by a mortar, and dried. The resulted mixed raw material and graphite were charged in a tubular furnace, and calcined at 970° C. for 30 hours under ammonia flow (50 ml/min.). Formation of a single phase of $La_{1.7}Tb_{0.3}O_2CN_2$ was confirmed by using a powder X ray diffraction apparatus [manufactured by Rigaku Denki K.K., Geiger Flex, SG-7 type].

The resulted phosphor was irradiated with ultraviolet ray by using an excimer 146 nm lamp (manufactured by Ushio Denki K.K.) in a vacuum chamber of $5 \times 10^{-2}$ Torr or less, to cause strong emission of green light.

What is claimed is:

1. A phosphor for a vacuum ultraviolet excited light emitting device, obtained by adding Eu as an activating agent to a substrate comprising a compound represented by the general formula $M^1M^2M^3O_4$, wherein $M^1$ represents at least one element selected from Na and Li, $M^2$ represents at least one element selected from Gd and Y, and $M^3$ represents Ge, or Ge and Si, with the proviso that when $M^1$ is Na or Li, $M^2$ is Gd and Y, and when $M^2$ is Gd or Y, $M^1$ is Na and Li.

2. The phosphor according to claim 1, wherein said phosphor is represented by the general formula $Na(Gd_{1-b}Y_b)_{1-a}Eu_aGeO_4$ wherein a and b satisfy the following equations: $0.003 \leq a \leq 0.5$ and $0.005 \leq b \leq 1.00$, respectively.

3. A vacuum ultraviolet excited light emitting device containing the phosphor according to claim 1.

4. A vacuum ultraviolet excited light emitting device containing the phosphor according to claim 3.

5. A phosphor for a vacuum ultraviolet excited light emitting device, obtained by adding Eu as an activating agent to a substrate comprising a compound containing SrO, $Al_2O_3$ and $B_2O_3$, wherein said phosphor is represented by the general formula $Sr_{1-a}Eu_aAl_2B_2O_7$ and a satisfies the equation: $0.003 \leq a \leq 0.5$.

6. A vacuum ultraviolet excited light emitting device containing a phosphor according to claim 5.

7. A vacuum ultraviolet excited light emitting device containing a phosphor obtained by adding Eu as an activating agent to a substrate comprising a compound containing SrO, $Al_2O_3$ and $B_2O_3$.

8. A phosphor for a vacuum ultraviolet excited light emitting device, obtained by adding Eu or Tb as an activating agent to a substrate comprising a compound represented by the general formula $M_2O_2CN_2$, wherein M represents at least one elements selected from La, Y and Gd.

9. The phosphor according to claim 8, wherein said phosphor is represented by the general formula $La_{2-a}Eu_aO_2CN_2$ or $La_{2-a}Tb_aO_2CN_2$ and a satisfies the equation: $0.003 \leq a \leq 1$.

10. The phosphor according to claim 9, wherein 0.5 to 100 mol % of La is substituted with Y.

11. The phosphor according to claim 9, wherein 0.5 to 100 mol % of La is substituted with Gd.

12. A vacuum ultraviolet excited light emitting device containing a phosphor according to claim 8.

13. A vacuum ultraviolet excited light emitting device containing a phosphor according to claim 9.

14. A phosphor for a vacuum ultraviolet excited light emitting device, obtained by adding Tb as an activating agent to a substrate comprising a compound represented by the general formula $M^1M^2M^3O_4$, wherein $M^1$ represents at least one element selected from Na and Li, $M^2$ represents at least one element selected from Gd and Y, and $M^3$ represents Ge, or Ge Si.

15. The phosphor according to claim 14, wherein said phosphor is represented by the general formula $NaGd_{1-a}Tb_aGeO_4$ and a satisfies the $0.003 \leq a \leq 0.5$.

16. The phosphor according to claim 14, wherein said phosphor is represented by the general formula $Na(Gd_{1-b}Y_b)_{1-a}Tb_aGeO_4$ wherein a and b satisfy the following equations: $0.003 \leq a \leq 0.5$ and $0.005 \leq b \leq 1.00$, respectively.

17. A vacuum ultraviolet excited light emitting device containing the phosphor according to claim 14.

18. A vacuum ultraviolet excited light emitting device containing the phosphor according to claim 15.

19. A vacuum ultraviolet excited light emitting device containing the phosphor according to claim 16.

* * * * *